(12) United States Patent
Odom (10) Patent No.: US 12,168,417 B1
(45) Date of Patent: Dec. 17, 2024

(54) WHEEL LOCK

(71) Applicant: James Milton Odom, Tulsa, OK (US)

(72) Inventor: James Milton Odom, Tulsa, OK (US)

( * ) Notice: Subject to any disclaimer, the term of this patent is extended or adjusted under 35 U.S.C. 154(b) by 0 days.

(21) Appl. No.: 18/638,302

(22) Filed: Apr. 17, 2024

(51) Int. Cl.
*B60R 25/00* (2013.01)
*B60R 25/09* (2013.01)

(52) U.S. Cl.
CPC .................................. *B60R 25/093* (2013.01)

(58) Field of Classification Search
CPC .... B60R 25/00; B60R 25/093; Y10T 70/5841
USPC ........................................................... 70/226
See application file for complete search history.

(56) References Cited

U.S. PATENT DOCUMENTS

| | | | | |
|---|---|---|---|---|
| 3,695,071 A * | 10/1972 | West | ...................... | B60R 25/093 70/225 |
| 3,828,590 A * | 8/1974 | Thiebault | .................. | B60T 3/00 70/225 |
| 4,649,724 A * | 3/1987 | Raine | .................... | B60R 25/093 70/225 |
| 4,815,462 A | 3/1989 | Clark | | |
| 4,878,366 A * | 11/1989 | Cox | ...................... | B60R 25/093 70/226 |
| 5,301,527 A * | 4/1994 | Pollard | ................. | B60R 25/093 70/237 |
| 5,410,897 A * | 5/1995 | Edmondson | .......... | B60R 25/093 70/237 |
| 5,437,171 A * | 8/1995 | Owen | ...................... | B62H 5/14 70/226 |
| 5,836,186 A | 11/1998 | Winner, Jr. | | |
| 5,934,118 A | 8/1999 | Henness | | |
| 6,880,375 B1 | 4/2005 | Pettingill et al. | | |
| 6,997,022 B1 * | 2/2006 | DeMange | ............. | B60R 25/093 70/226 |
| 7,278,520 B2 * | 10/2007 | Kim | ........................ | B60R 25/09 188/4 R |
| 2005/0247087 A1 * | 11/2005 | Clarke | .................. | B60R 25/093 70/226 |
| 2011/0247377 A1 * | 10/2011 | Wu | ....................... | B60R 25/093 70/226 |

* cited by examiner

*Primary Examiner* — Suzanne L Barrett (57) ABSTRACT

A wheel lock having an L-shaped member and a hub mount. When coupled to a wheel of a trailer, the rotation of the wheel forces the L-shaped member into the ground, or into the underside of the trailer, thus immobilizing the wheel from rotating. Additionally, a puck lock, and a locking member having a lock guard, are utilized to ensure that the lock is not tampered with. Furthermore, a shield is incorporated to prevent an unauthorized user from removing the fasteners that secure the wheel lock to the wheel of the trailer.

14 Claims, 11 Drawing Sheets

WHEEL LOCK

FIELD OF THE INVENTION

The present invention relates generally to a wheel lock. More specifically, the present invention is a wheel lock for immobilizing the wheel of a vehicle, including trailers.

BACKGROUND OF THE INVENTION

The realm of security devices for vehicles, particularly those designed to prevent the unauthorized use or theft of trailers, has seen a variety of innovations aimed at deterring thieves. The majority of these devices have focused on securing the trailer's hitch, the point at which the trailer connects to a towing vehicle. While effective in some scenarios, these hitch-based security solutions have consistently fallen short in providing a foolproof mechanism against determined and resourceful thieves. The inventive step discussed herein seeks to address these shortcomings by providing a means of immobilizing the wheel of trailers.

Prior art in the field of trailer and vehicle security has predominantly centered around locks that attach directly to the trailer hitch or employ wheel clamps that are designed to prevent the wheel from turning. While these methods offer some deterrent, they are not without their vulnerabilities. Hitch locks, for example, can be bypassed by thieves who opt to chain the trailer's hitch to their vehicle and tow it away, effectively negating the lock's purpose. Similarly, traditional wheel clamps, though cumbersome for thieves to remove, can be defeated with enough time and the right tools. These devices also do not prevent the lifting of the trailer onto another vehicle or trailer dolly, thus providing another avenue for theft.

Recognizing these vulnerabilities, the present invention introduces a wheel lock that substantially diverges from the concepts of the prior art. The invention comprises a hub mount that securely attaches to a wheel of the trailer using lug nuts. An L-shaped member extends from the hub mount towards the outer diameter of the wheel. The short member of the L-shaped member then extends underneath the vehicle, specifically a trailer in this context. This configuration ensures that any attempt to rotate the tire will result in the short member either embedding into the ground or forcibly impacting against the underside of the trailer, effectively preventing movement.

One of the significant innovations of this invention is the inclusion of a shield designed to protect the nuts from being accessed by unauthorized users. This shield acts as a deterrent against the simple removal of the wheel lock by unauthorized parties, addressing a common pitfall of similar security devices.

Furthermore, the invention incorporates a puck lock, a robust and tamper-resistant lock type known for its resistance to cutting, picking, and drilling. The use of a puck lock in conjunction with the wheel lock significantly enhances the overall security of the device, making it exceedingly difficult for thieves to remove the lock without authorization.

The primary objective of this invention is to provide a security device that effectively prevents the theft of trailers. By focusing on the wheel rather than the hitch, this invention addresses a critical vulnerability in trailer security. The innovative design of the wheel lock, combined with the shield and puck lock, offers a comprehensive solution that significantly impedes the ability of thieves to move the trailer without authorization.

In summary, the present invention surpasses the limitations of the prior art by introducing a wheel lock mechanism that is significantly more resistant to tampering and unauthorized removal. By focusing on securing the wheel and utilizing a novel L-shaped member mechanism, the invention provides an effective deterrent against the theft of trailers. This wheel lock invention not only addresses the specific shortcomings of hitch locks and wheel clamps but also establishes a new standard in trailer security.

DETAIL DESCRIPTIONS OF THE INVENTION

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a wheel lock 1 as shown FIGS. 1-9, embodiments of the present disclosure are not limited to use only in this context.

Figure 1:
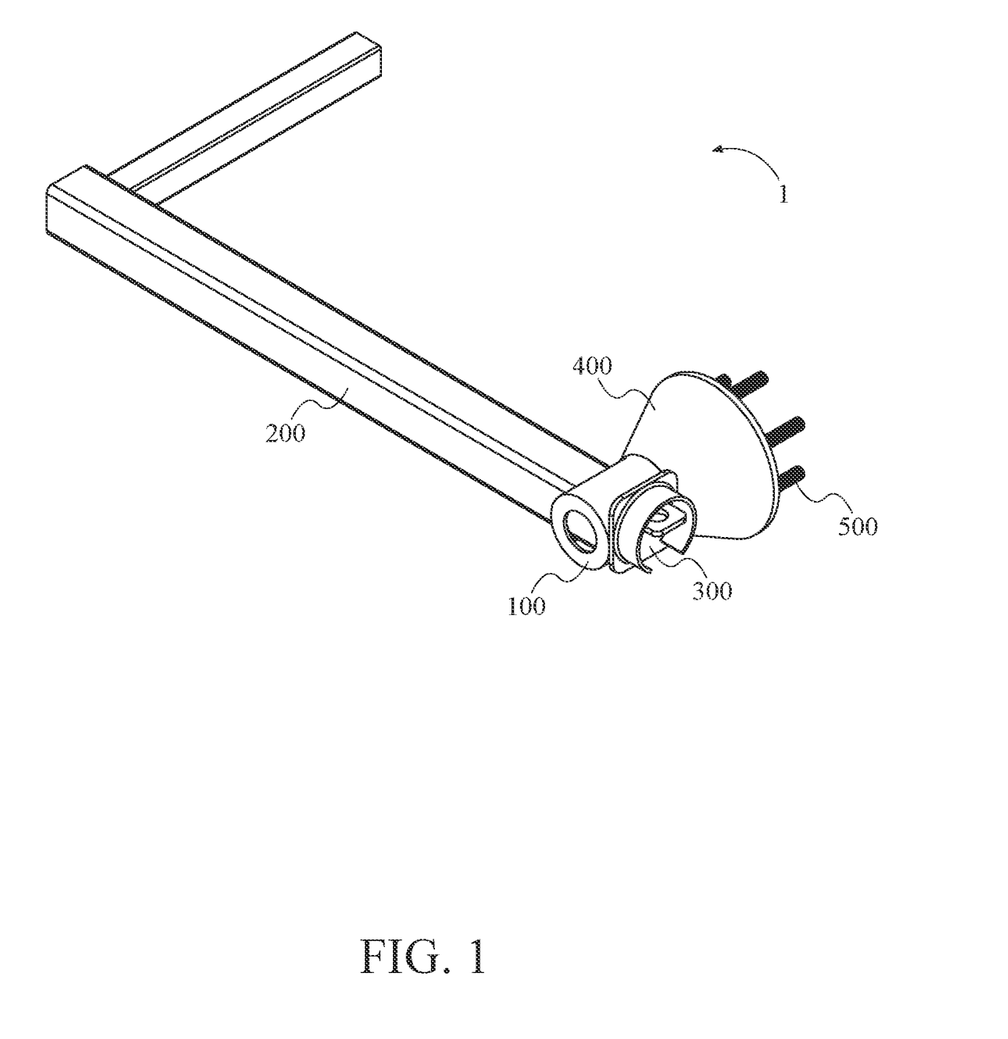
FIG. 1 is a perspective view of the present invention.

As shown in FIG. 1, the present invention is a wheel lock comprising a hub mount 100, an L-shaped member 200, a locking member 300, a shield 400, and a plurality of fasteners 500. As shown, the L-shaped bracket 200 is coupled to the hub mount 100 and the locking member 300 engages with the L-shaped member 200, adjacent to the hub mount 100. As further shown in FIG. 1 and FIG. 2, the plurality of fasteners 500 traverse the hub mount 100, wherein the shield 400 conceals a portion of the plurality of fasteners 500. In the context of the present invention, the plurality of fasteners 500 are preferably each comprised of a lug nut 510 threadedly coupled to a threaded bolt 520, as shown in FIG. 3. In such embodiments, the threaded bolt 520 is the existing lug bolt that is coupled to the wheel of a vehicle. Alternatively, within some embodiments of the present invention, the plurality of fasteners 500 may be selected from either a plurality of lug nuts 510 or a plurality of lug bolts. Within the context of the present invention, the plurality of fasteners 500 is not limited to such and may be composed of any fastener means known within the art. In the preferred embodiment of the present invention, the shield 400 prevents tampering of the plurality of fasteners 500.

Figure 2:
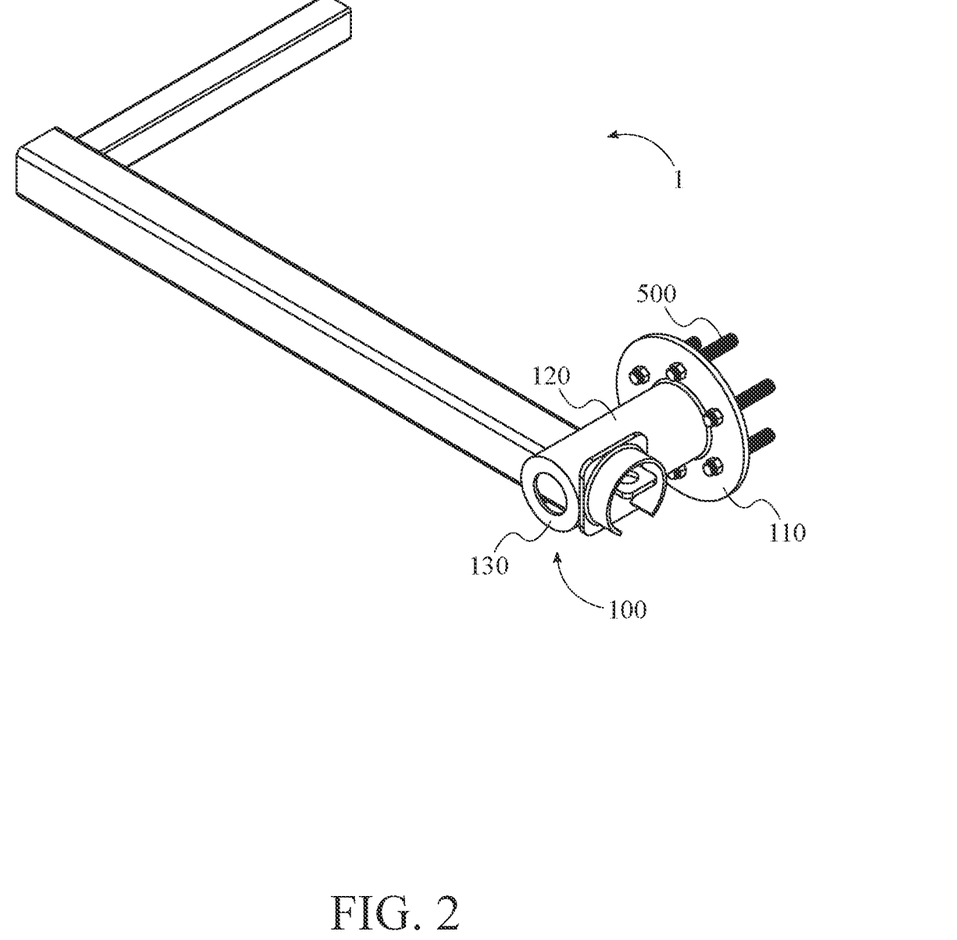
FIG. 2 is a perspective view of the present invention without the shield.
Figure 3:
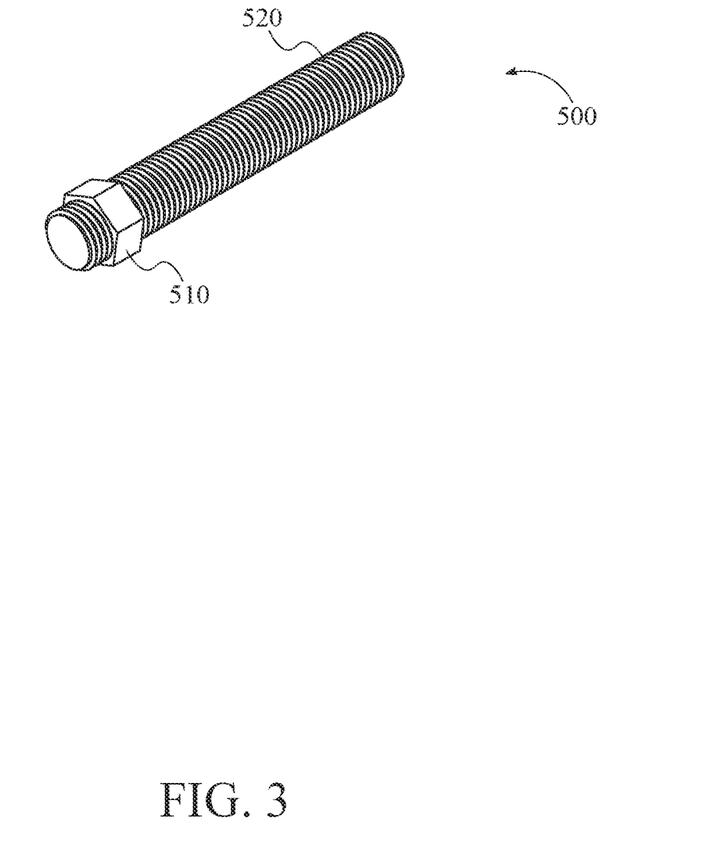
FIG. 3 is a perspective view of a fastener of the present invention.
Figure 4:
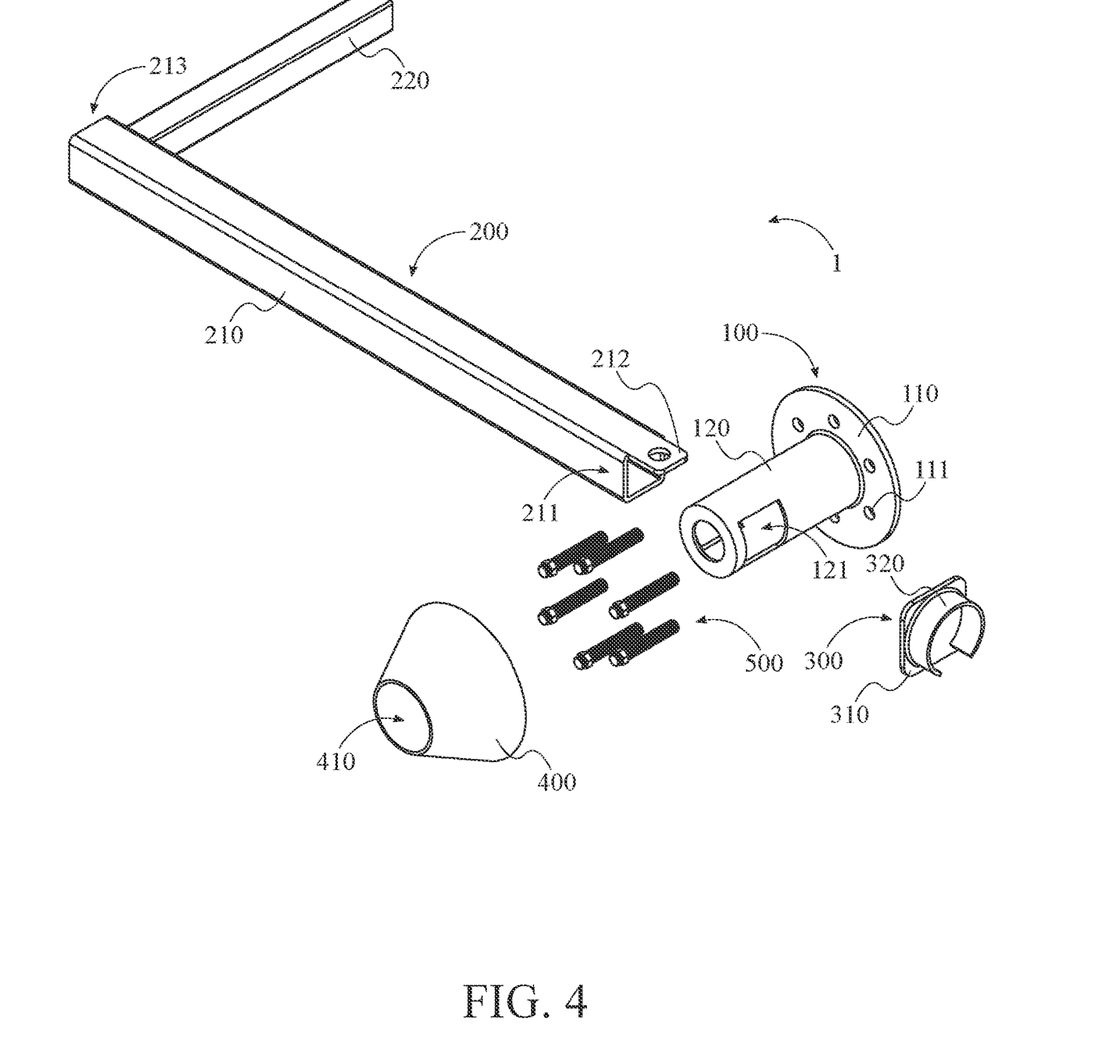
FIG. 4 is an exploded perspective view of the present invention.

As shown in FIG. 2 and FIG. 4, the hub mount 100 comprises a base plate 110 and a column 120. In the preferred embodiment of the present invention, the base plate 110 is a circular disk that couples to a wheel 3 (shown in FIG. 9 and FIG. 10). Furthermore, in the preferred embodiment of the present invention, the column 120 is a cylindrical tube that extends normally from the base plate 110. As shown in FIG. 2, the base plate 110 comprises a plurality of fastener mount holes 111 wherein each hole receives one of the plurality of fasteners 500. In the preferred embodiment of the present invention, the plurality of mount holes 111 aligns with a series of holes on a hub of the wheel 2. Furthermore, the column 120 of the hub mount 100 comprises a through slot, 121, wherein said through slot 121 traverses the diameter, or width, or the column 120. In some embodiments of the present invention, the hub mount 100 may further comprises a top plate comprising a hole 130 located at the distal end of the column 120, opposite the base plate 110.

Figure 5:
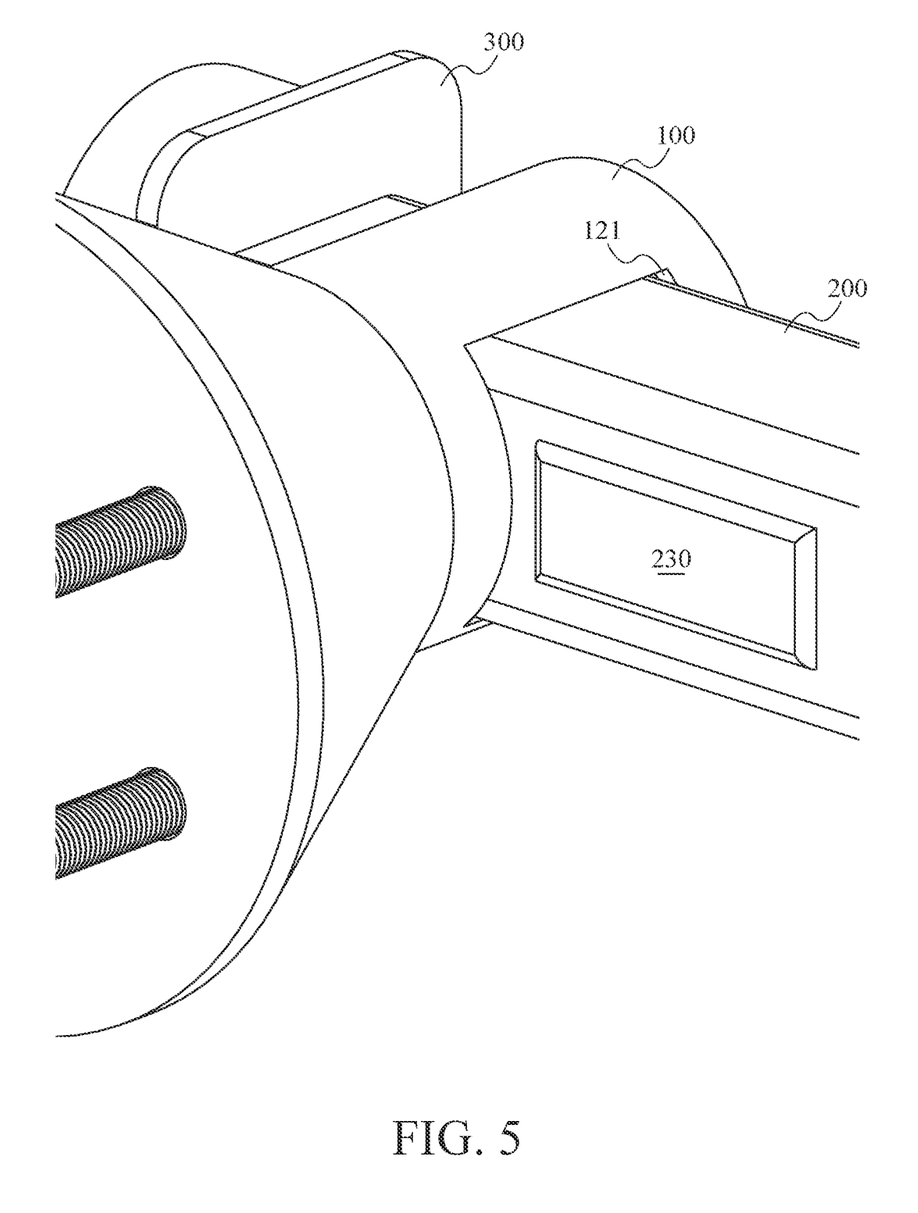
FIG. 5 is a detailed perspective view of the stop positioned on the L-shaped member.

As further shown in FIG. 4, the L-shaped member 200 comprises an elongated member 210 and a shortened member 220, wherein the shortened member 220 extends perpendicularly from the elongated member 210. In the context of the present invention, terms "elongated" and "shortened" are used to denote length in relation to the corresponding members wherein the elongated member 210 comprises a greater length than the shortened member 220. In the preferred embodiment of the present invention, the elongated member 210 comprises a first end 211 and a second end 212 wherein said ends are opposite distal ends. In the preferred embodiment of the present invention, the shortened member 220 extends from the second end 212 of the elongated member 210. Furthermore, within the preferred embodiment of the present invention the first end 211 of the elongated member 210 comprises a tab 212 wherein said tab comprises a through hole. Furthermore, as shown in FIG. 5, the L-shaped member 200 further comprises a stop 230, as shown in FIG. 5, wherein said stop 230 is positioned on the elongated member 210, thus preventing the L-shaped member 200 from sliding fully through the slot 121 of the hub mount 100.

Figure 6:
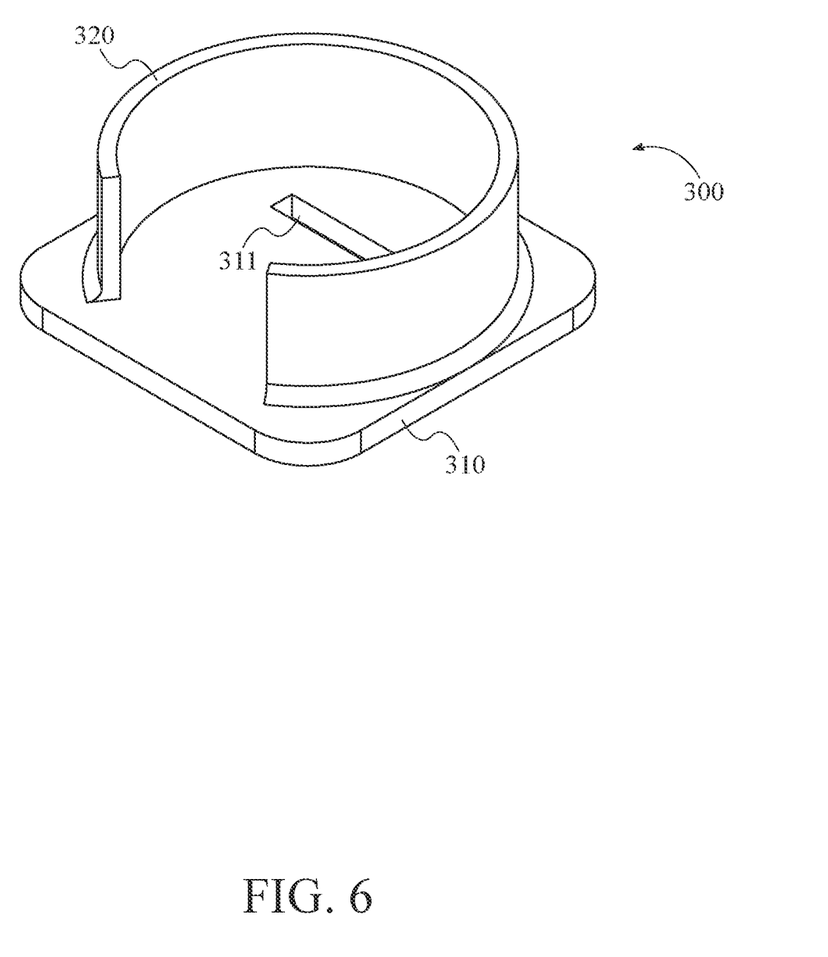
FIG. 6 is a perspective view of the locking member of the present invention.

Furthermore, as shown within FIG. 4 and FIG. 6, the locking member 300 comprises a plate 310 and a lock guard 320. Additionally, within the preferred embodiment of the present invention, the plate 310 further comprises a through slot 311. In the preferred embodiment of the present invention, the lock guard 320 extends outwardly from the plate 310, forming an enclosed area around the slot 311 of the plate 310. In the context of the present invention, the locking member 300 may also be referred to as a hasp, as understood by one of ordinary skill in the art.

As shown in FIG. 1 and FIG. 4, the shield 400 is a conical sheath comprising an opening 410. In the preferred embodiment of the present invention, the shape of the sheath is not limited to a conical shape. Furthermore, within the preferred embodiment of the present invention, the shield 400 is a component of the present invention that prevents an unauthorized user from tampering with the plurality of fasteners 500. Additionally, as shown in FIG. 1, in the preferred embodiment of the present invention, the shield 400 is positioned around the column 120 of the hub mount 100 and interposed between the base plate 110 and though slot 121 of the hub mount 100. In the aforementioned embodiment, the position of the locking member 300 and the L-shaped member 200 retain the shield 400 in place, thus inhibiting an unauthorized user from accessing the plurality of fasteners 500.

Figure 7:
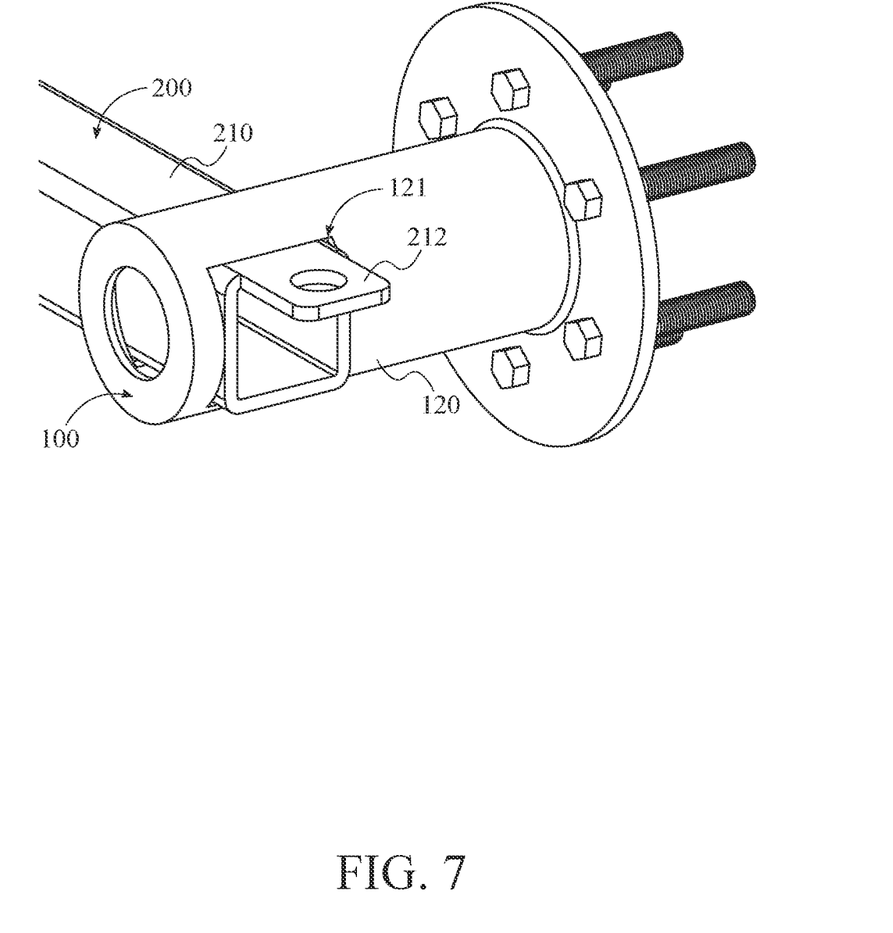
FIG. 7 is a detailed perspective view of the hub mount and the L-shaped bracket.
Figure 8:
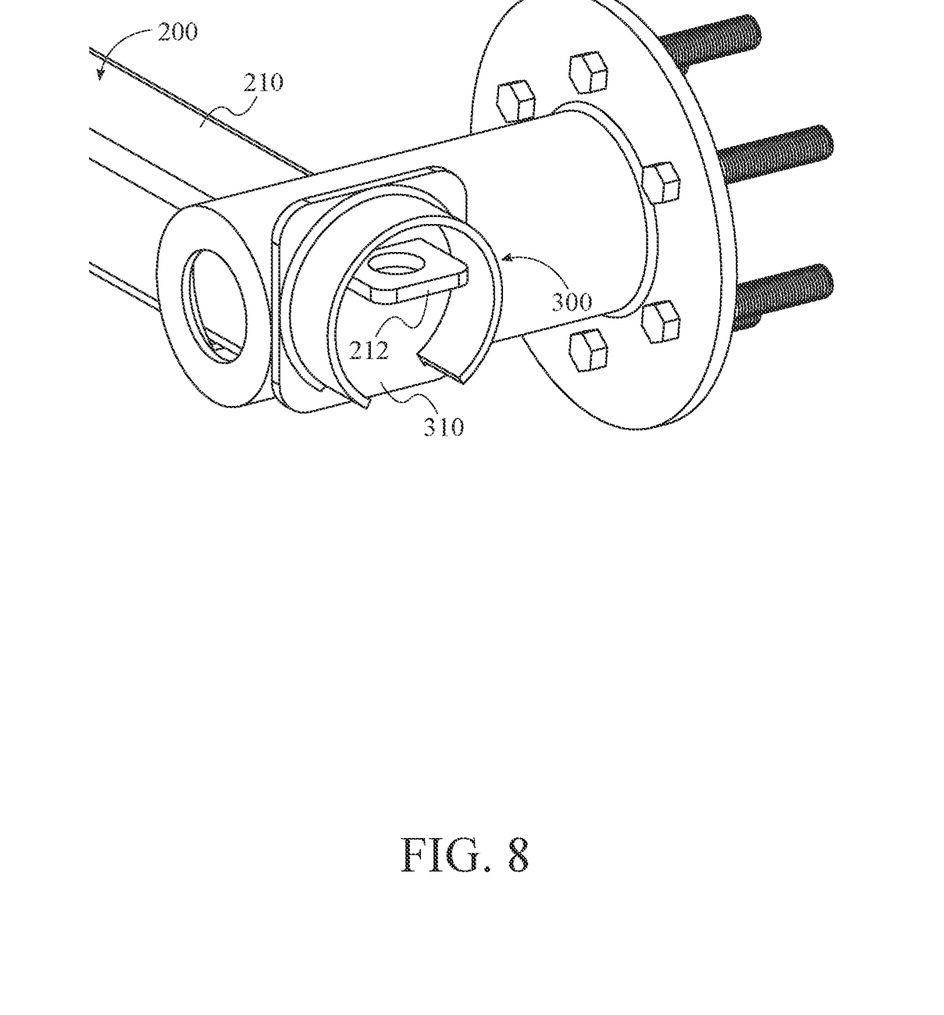
FIG. 8 is a detailed perspective view of the hub mount, the L-shaped bracket, and the locking member.
Figure 9:
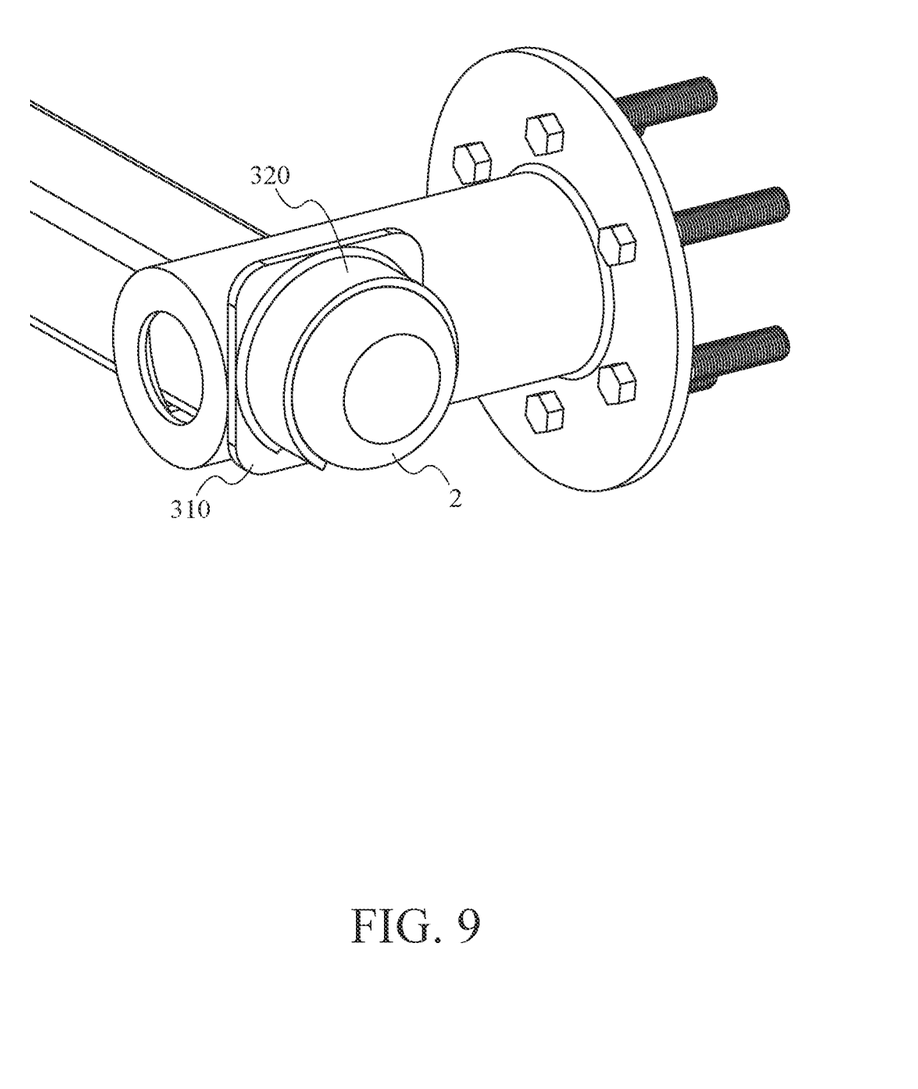
FIG. 9 is a detailed perspective view of the present invention comprising a puck lock.

As shown in FIG. 7, in the preferred embodiment of the present invention, the first end 211 of the elongated member 210 of the L-shaped member 200 traverses through the through slot 121 of the column 120 of the hub mount 100. As shown in FIG. 8, the locking member 300 is then coupled to the tab 212 of the elongated member 210, tangentially adjacent to the column 120 of the hub mount 100, whereby the tab 212 of the elongated member 210 traverses the slot 311 on the plate 310 of the locking member 300. Lastly, as shown in FIG. 9, a puck lock 2 is then used to lock the wheel lock 1 together, immobilizing the elongated member 210 from disengaging from the locking member 300. In the preferred embodiment of the present invention, the puck lock 2 is interposed within the enclosed area formed by the lock guard 320.

Figure 10:
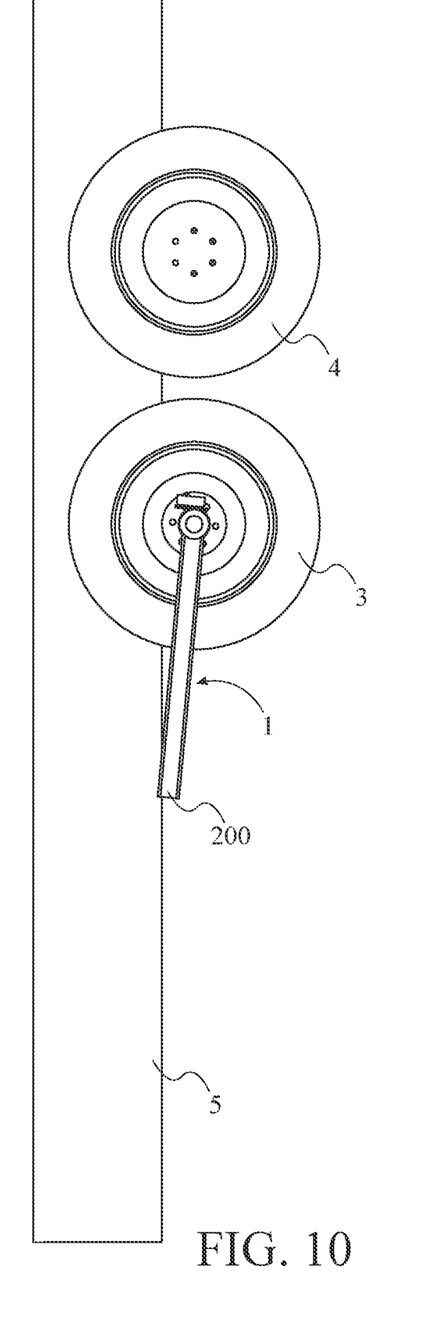
FIG. 10 is a side view of the present invention, coupled to a wheel, interfering with a trailer.
Figure 11:
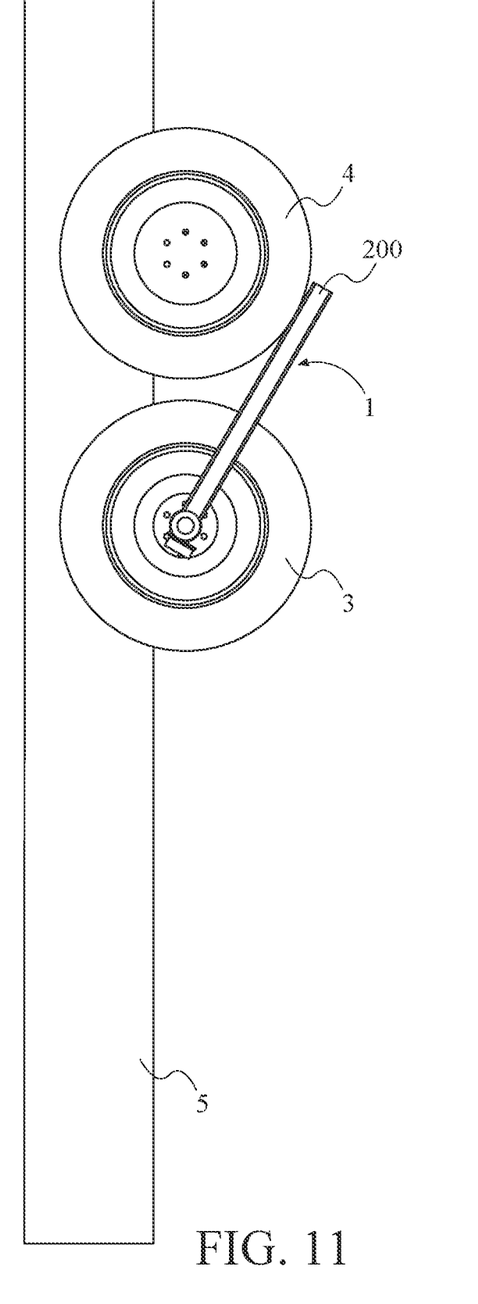
FIG. 11 is a side view of the present invention, coupled to a first wheel, interfering with a second wheel.

In the preferred embodiment, the wheel lock 1 is to be used to secure the wheel 3 of a trailer 5. In the preferred embodiment, as shown in FIG. 10, when coupled to the wheel 3, the wheel lock 1 will engage with the trailer 1, preventing the wheel 3 from rotating further. More specifically, in such embodiments, the shortened member 220 of the L-shaped member 200 interferes with the trailer 5, thus preventing the wheel 3 from rotating. In alternative embodiments of the present invention, as shown in FIG. 11, wherein the trailer 5 comprises a second wheel 4 adjacent to the first wheel 3, the wheel lock 1 may engage with the second wheel 4, further preventing the first wheel 3 from rotating. More specifically, in such embodiments, the shortened member 220 interferes with the second wheel 4, thus preventing the first wheel 3 from rotating.

Although the invention has been explained in relation to its preferred embodiment, it is to be understood that many other possible modifications and variations can be made without departing from the spirit and scope of the invention.

What is claimed is:

1. A wheel lock comprising:
a hub mount; and
an L-shaped member;
wherein:
   the hub mount is fastened to a wheel;
   the L-shaped member inhibiting the wheel from completing a full rotation;
   the hub mount is composed of a base plate and a column;
   the base plate is a circular disk that couples to a wheel;
   the column is a cylindrical tube protruding from the base plate;
   the L-shaped member comprises an elongated member and a shortened member;
   the elongated member comprises a first end and a second end;
   the first end of the elongated member slidably traverses through the column;
   the first end of the elongated member further comprises a tab extending outwardly; and
   the shortened member extending perpendicularly from the second end of the elongated member.

2. The wheel lock as claimed in claim 1, wherein the column comprises a through slot;
the through slot receiving the first end of the elongated member of the L-shaped member; and
the tab of the elongated extending beyond the through slot.

3. The wheel lock as claimed in claim 1 wherein the base plate of the hub mount further comprises a plurality of mounting holes.

4. The wheel lock as claimed in claim 2, further comprising a locking member wherein said locking member comprises:
a plate; and
a lock guard;
the plate engaging the first end of the elongated member; and
the lock guard extending outwardly from the plate, forming an enclosed area around the tab.

5. The wheel lock as claimed in claim 4, wherein:
the plate of the locking member comprising a slot; and
the tab comprising a through hole;
wherein
   the tab comprising the through hole, traverses the slot of the locking member, whereby the through hole of the tab is positioned within the enclosed area formed by the lock guard.

6. The wheel lock as claimed in claim 3, further comprising a plurality of fasteners wherein said fasteners traverse the plurality of mounting holes, thus mounting the base plate to the wheel.

7. The wheel lock as claimed in claim 6 further comprising a shield;
the shield being a conical member
the narrow portion of the shield being positioned concentrically around the column of the hub mount;
the widest portion of the shield concealing the plurality of fasteners.

8. The wheel lock as claimed in claim 5 wherein the wheel lock is secured using a puck lock;
the puck lock engaging the tab of the elongated member;
the puck lock further being interposed within the enclosed area formed by the lock guard.

9. A wheel lock comprising:
a hub mount;
an L-shaped member; and
a locking member;
wherein:
   the hub mount is fastened to a wheel;
   the L-shaped member comprises a first end wherein said first end comprises a tab;
   the tab comprises a through hole;
   the L-shaped member couples to the hub mount whereby the tab traverses through the hub mount;
   the locking member comprising a slot;
   the tab traversing through the slot, whereby the through hole is accessible;

the locking member preventing the L-shaped member from disengaging with the hub mount; and the L-shaped member inhibiting the wheel from completing a full rotation.

10. The wheel lock as claimed in claim 9, wherein the hub mount further comprises:
a base plate; and
a column;
wherein:
  the base plate is a circular disk that couples to wheel;
  the column is a cylindrical tube protruding from the base plate;
  the column further comprising a through slot wherein the L-shaped member traverses the through slot of the column; and
  the L-shaped member further comprising a stop;
  the column being maintained between the stop and the locking member.

11. The wheel lock as claimed in claim 10, wherein the L-shaped member further comprises:
an elongated member; and
a shorted member;
wherein
  the elongated member comprises the first end and a second end; and
  the shortened member extending perpendicularly from the second end of the elongated member.

12. The wheel lock as claimed in claim 9, further comprising a locking member wherein said locking member comprises:
a plate; and
a lock guard;
wherein:
  the plate comprises the slot;
  the plate further engaging the first end of the elongated member; and
  the lock guard extending outwardly from the plate, forming an enclosed area around the slot of the plate.

13. The wheel lock as claimed in claim 9, further comprising a plurality of fasteners, wherein said fasteners coupled the base plate to the wheel.

14. A wheel lock comprising:
a hub mount;
an L-shaped member;
a locking member;
a shield;
a puck lock; and
a plurality of fasteners;
wherein
  the plurality of fasteners secures the hub mount to a wheel;
  the shield concealing the plurality of fasteners;
  the L-shaped member engaging the hub mount;
  the locking member engaging the L-shaped member, thereby preventing the L-shaped member from disengaging the hub mount; and
  the puck lock couples the locking member to the L-shaped member, preventing the locking member from disengaging from the L-shaped member.

\* \* \* \* \*